Figure 3:
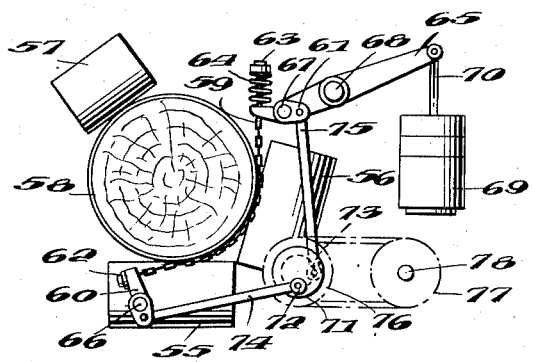

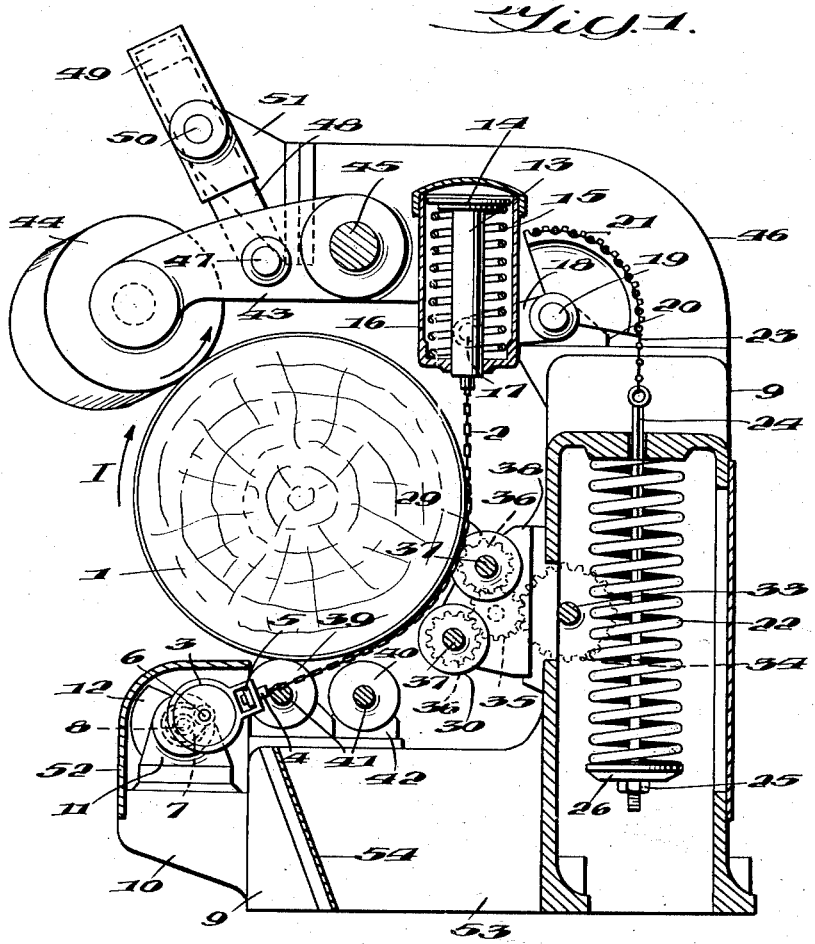

Nov. 27, 1951  N. G. LEFFLER  2,576,127
MACHINE FOR BARKING LOGS
Filed Nov. 6, 1946  5 Sheets-Sheet 2

INVENTOR
Nils Gustav Leffler
BY Pierce, Scheffler & Parker
his ATTORNEYS

Nov. 27, 1951 N. G. LEFFLER 2,576,127
MACHINE FOR BARKING LOGS
Filed Nov. 6, 1946 5 Sheets-Sheet 3
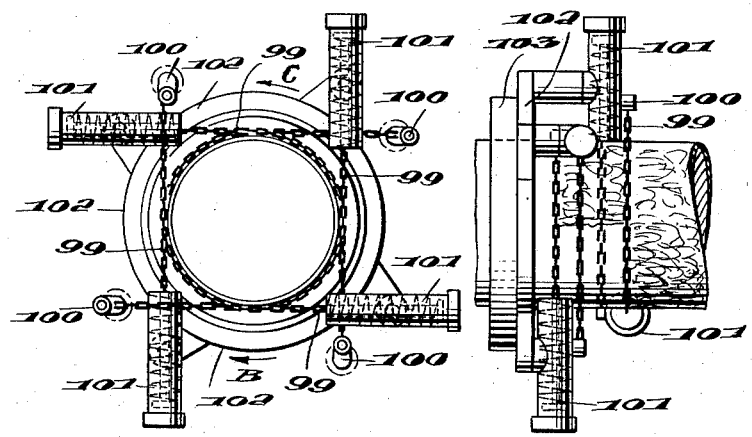
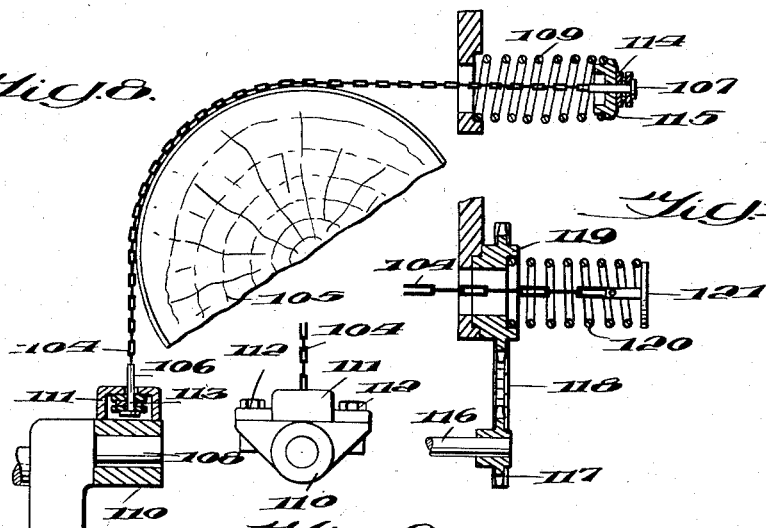
INVENTOR
Nils Gustav Leffler
BY Pierce, Scheffler & Parker
his ATTORNEYS Nov. 27, 1951          N. G. LEFFLER          2,576,127

MACHINE FOR BARKING LOGS

Filed Nov. 6, 1946          5 Sheets-Sheet 4

Inventor
Nils Gustav Leffler
By
Pierce, Scheffler & Parker
his ATTORNEYS

Nov. 27, 1951  N. G. LEFFLER  2,576,127
MACHINE FOR BARKING LOGS.
Filed Nov. 6, 1946  5 Sheets-Sheet 5

INVENTOR
Nils Gustav Leffler
BY Pierce, Scheffler & Parker
his ATTORNEYS

Patented Nov. 27, 1951

2,576,127

UNITED STATES PATENT OFFICE 2,576,127

MACHINE FOR BARKING LOGS

Nils Gustav Leffler, Sundsbruk, near Sundsvall, Sweden, assignor to Svenska Cellulosa Aktiebolaget, Stockholm, Sweden Application November 6, 1946, Serial No. 708,123
In Sweden November 19, 1945

11 Claims. (Cl. 144—208)

For barking logs, such as saw logs, pulpwood, thinning material and the like, a plurality of methods and machines have been proposed. The previous methods using knife-barking machines, in which the logs were barked by means of rotating knives—resulting in considerable losses of wood—have been superseded by the use of barking drums and barking basins or boxes in which the barking effect is obtained by the logs being caused to rub against each other while subjected to a heavy pressure from overlying logs.

However, the methods using the last mentioned types of machines involve considerable drawbacks. The dimensions of the machine have to be large, because a great number of logs must be treated at the same time to obtain a barking effect. This fact necessitates thickness and clumsiness of all parts of the machines. The machines are expensive to make and, in addition, the operating and maintenance costs are considerable. The removal of the bark from the machines requires large quantities of water and therefore machines of this kind must be located near rivers or lakes.

The present invention has for its object to eliminate the above mentioned drawbacks and at the same time to create several advantages in connection with the barking of logs. On one hand, the invention relates to a special method of barking logs, such as saw logs, pulpwood and the like, and, on the other hand, it is concerned with a particular type of a machine by which the method according to the invention may readily be carried into effect.

The substantial features of the method according to the invention consist in keeping a log in frictional engagement with at least one member adapted for barking, keeping at least one of the frictionally engaged elements (log or barking member) in motion relatively to the other, causing at least one of said elements to perform also reciprocating motions, and generating said motions in any convenient manner.

The reciprocating motions, which may be rectilinear or orbital, rapid or slow, short or long, preferably are of an accelerating-retarding character.

By chaning the amplitude of the motion the reciprocating barking effect may be varied.

The machine according to the invention comprises substantially at least one member adapted for barking, means for supporting said barking member, means for bringing a log into frictional engagement with said barking member, means for maintaining and releasing such frictional engagement, means for causing at least one of the frictionally engaged elements (log or barking member) to move relatively to the other, means for causing at least one of the frictionally engaged elements to perform also reciprocating motions, and means for generating said motions in any convenient manner.

The barking member is a flexible element, such as a chain, a wire or the like, adapted to follow smoothly the contour of a log.

The invention includes a great number of ways in which the barking member and the log may be moved in relation to each other for the purpose of obtaining the barking effect desired.

The invention also includes a great number of ways in which to generate the motion imparted to the barking member and/or the log.

For example, the barking member may be given a reciprocating motion along the surface of the log, or towards and away from said surface, or the barking member may be caused to perform a motion constituting a combination of said two motions. According to one embodiment, for example, the barking member is given a reciprocating motion in a direction extending at an angle to the direction in which the log is fed. Likewise, the barking member, particularly when it consists of a chain, a wire or the like, may be adapted to turn around its own longitudinal axis, which axis, according to different embodiments, may be straight or extend wholly or partly in a bend around the log. This provides for a smooth operation, because the barking member will not catch on twigs or the like but will roll over the same. By arranging a special driving mechanism for the barking member such rolling of the member will be guaranteed. This embodiment may be extended in such a manner that the chain is driven at such a speed and/or in such a direction that barking will be obtained only by that motion, the reciprocating motion thus being superfluous.

In a corresponding manner the log, instead of the barking member, may be caused to perform the reciprocating motion in various directions, and, finally, both the barking member and the log may be given such reciprocating motions.

These and other features of the present invention will appear from the following description and the accompanying drawings, the latter illustrating some embodiments of barking devices operating in accordance with the principle of the present invention. However, it is to be understood that the embodiments shown are meant only to exemplify some ways of carrying out the invention without restricting in any way the scope of the same.

Figure 1 is a section, on line 1—1 of Figure 2, of an embodiment of a barking machine according to the invention.

Figure 2, on a smaller scale, is a top view of a portion only of the machine illustarted in Figure 1.

Figure 3, diagrammatically, shows the movable parts of an embodiment similar to that shown in Figures 1 and 2.

Figures 4–7, likewise diagrammatically, show other embodiments, Figure 6 showing the device according to Figure 7 when viewed from the right.

Figures 8–10 illustrate one way of applying a barking member, consisting of a chain.

Figure 4:
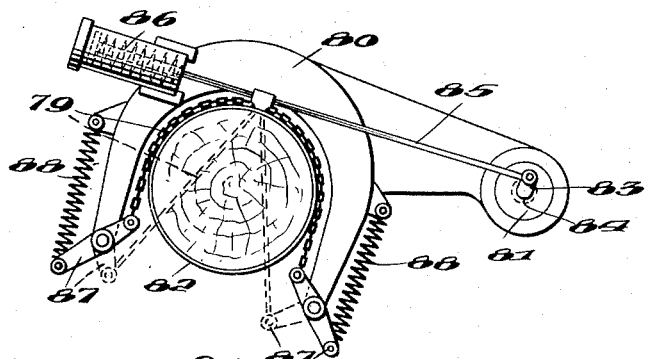
Figure 11:
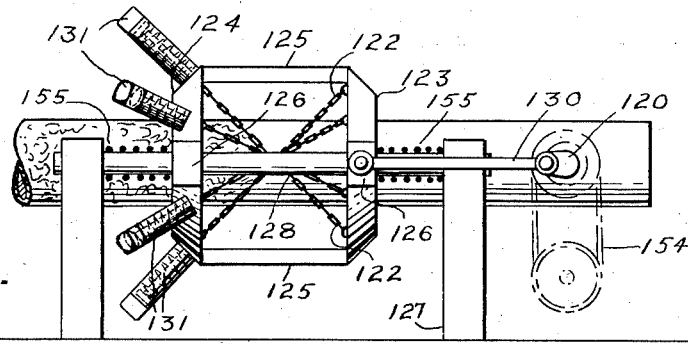
Figure 12:
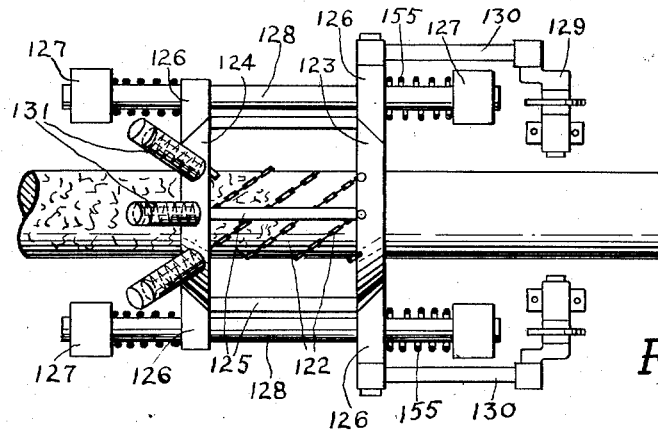
Figures 13, 14:
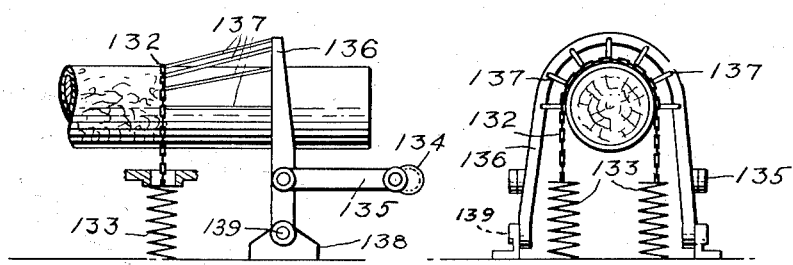
Figure 15:
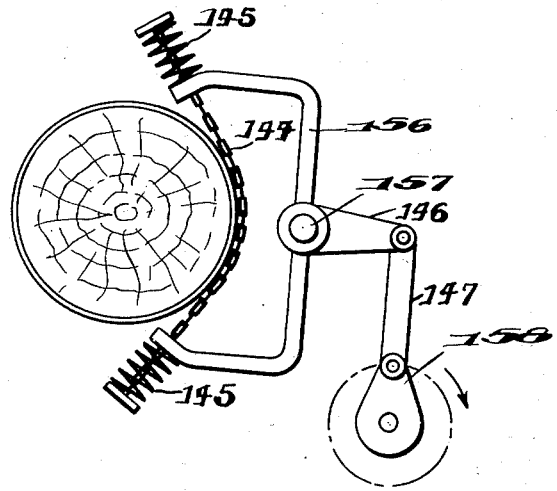
Figure 16:
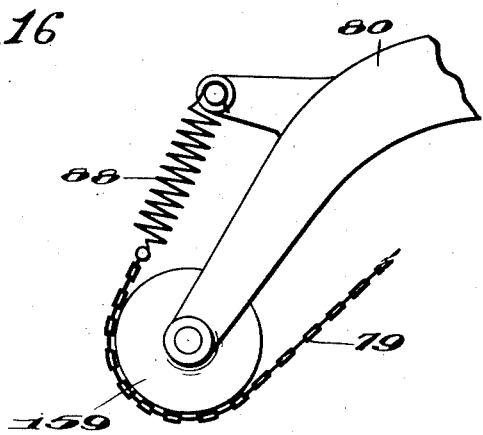

Figs. 11 and 12 show a side view and a top view respectively of an embodiment in which the flexible elements are reciprocated end-wise of the log, Figs. 13 and 14 show a side view and an end view respectively of another embodiment in which the flexible element is reciprocated end-wise of the log, Fig. 15 shows an embodiment in which the opposite ends of the flexible member are secured to the ends of a U-shaped member which is mounted to reciprocate about an axis, and Fig. 16 shows a modification of the mounting of the flexible element illustrated in Fig. 4.

The barking of a log 1 (see Figures 1 and 2) is effected by means of a member 2, which may consist of a chain, preferably with rounded links, a wire or some other element smoothly following the contour of the log 1. At its one end the chain 2 is secured to a tube 3 by means of a pin 4, which is turnably mounted in an axial roller bearing 5. At its ends the tube 3 is provided with pins 6 which are—preferably in ball bearings or roller bearings—rotatably secured to cranks 7 on a shaft 8, which is journaled in bearings 11 provided on brackets 10 of a frame 9 of the machine. For the purpose of balancing the tube 3 the cranks 7 are provided with counterweights 12. Above this assembly of parts there is provided a protecting member, such as a hood or the like 52. At its other end the chain 2 is secured through an axial roller bearing to one end of a thin-walled tubular sleeve 13, which at its other end is formed with a flange 14 for contacting a helical spring 15. The function and provision of the axial bearings will be described in detail in connection with the figures relating thereto. The helical spring 15 is provided in a sleeve 16, which by means of its pins 17 is turnably secured to arms 18, which are also turnably mounted on pivots 19 on brackets 20 secured to the frame 9. The arms 18 are formed with toothed segments 21 connected with a spring 22 by means of a roller chain 23, a spindle 24, an adjusting nut 25 and a washer 26.

The shaft 8 (see Figure 2) is rotated by an electric motor 28 and a cone belt drive 27, the pins 6, and with them also the tube 3, being given a revolving motion, the center of which is located at the center of the shaft 8. That portion of the chain 2, which is located next to the tube 3, will swing and oscillate like a connecting rod, being moved in one direction by the tube and in the other direction by the spring 15, the mounting of which preferably oscillates in synchronism with the tube, all the time keeping the chain 2 under suitable tension against the log. In such a case it is preferred to let the spring 15 have its greatest compression in the lower terminal position of the sleeve 13, because during the first half of its upward movement it has to overcome the inertia of parts being accelerated, as well as all frictional resistance, whereas during the latter part of its movement it has to overcome only the frictional forces between the chain and the log. By suitably designing the spring 15, a practically constant contact pressure against the log may be obtained in the various positions of the chain. Due to the fact that the axis of the tube 3 is not perpendicular to the longitudinal axis of the chain—in which way it may, of course, be arranged—there will be obtained, in addition to the reciprocating motion in the longitudinal direction of the chain, also a lateral reciprocating motion. Preferably the chain is drawn by the tube 3, when said lateral motion is directed against the log feeding direction, and by the spring 15, when said lateral motion is directed in the log feeding direction.

The spring 22 actuates the chain 2 by way of a lever or arm system, previously described, and has for its object to absorb the rather slow movements of the chain, caused, for example, by gnarls and twigs of the log, by a change of the position of the sleeve 16 in case of different log diameters or by the machine running without any log in it. The design of said spring is preferably such that the natural frequency of the crank system will be lower than that of the tube 3. Although the springs 15 and 22 shall have practically the same tension the design on the above indicated lines of the natural frequency is not difficult, the mass acting on the spring 15 being considerably less than the mass acting on the spring 22. The contact pressure of the chain against the log can be changed by turning the nut 25 and in this way tightening or loosening the spring 22. It is possible easily to change the contact pressure of the chain while a barking operation is going on. The embodiment illustrated in the drawing discloses two springs to provide for a high frequency of the system consisting of the spring 15, the sleeve 13 and the chain 2. As shown in Figure 3, the spring 22 may also be replaced by a counterweight 69.

With a motion of the chain 2, as described, the barking effect is obtained by the chain sawing its way between the bark and the wood of the log. Because, in the embodiment shown in Figures 1 and 2, the chains cover only a small part of the surface of the log it will be necessary to move the log, too, in such a manner that the chains will traverse all parts of the log. In such a case it is suitable that the direction of movement of the log in relation to the chain will form an angle with the longitudinal axis of the chain. The closer said angle is to 90° the larger, of course, will be the part of the log covered by the same encircling angle of the chain. The bark from the log is intended to fall down through the opening 53 extending substantially along the whole length of the log. On three sides the opening 53 is limited by the frame 9 and on its fourth side by a guide member 54.

In the embodiment shown in Figures 1 and 2 the log is rotated helically in the direction of the arrow I. The helical movement is employed for the following reasons: In case of a thick log a chain, arranged obliquely in relation to the longitudinal axis of the log at an angle of between 0° and 90°, will cover a larger portion of the log at the same encircling angle than in case of a small log. If the angle of a chain relatively to the longitudinal axis of the log together with the encircling angle of the chain are designed, for example, in such a manner that the chain will cover an axial portion of the log which is equal to the distances between the individual chains, a helical movement of the log which will axially move the log said distance during each revolution, will clean the log in one revolution. This is true also if the log were only rotated without longitudinal displacement. However, in case of a log, which is only half as thick, the chain, with the same adjustment and encircling angle, will cover only a distance corresponding to about half the distance between the individual chains but if proceeding helically at the same peripheral speed and pitch as the thick log the thin log will be clean after two revolutions, i. e. within the same time as in the previous case, whereas in case of mere rotation without simultaneous longitudinal movement only half the log would become clean no matter how many revolutions the log would turn. In order to prevent these drawbacks connected with mere rotation of the log, the feeding device may be constructed in such a manner that after one revolution, for example, the log will be moved in the direction of its longitudinal axis a distance equal to the cleaned portion and then again rotated one revolution. Likewise, several chains may be provided, or the encircling angle increased, in case of thin logs. Among the advantages connected with the two last mentioned proposals there is to be said that thin logs are barked more quickly than thick ones.

As previously mentioned the log, in the embodiment according to Figure 1, is led in a continuous helical path. This is effected by means of rolls 29 and/or rolls 30, which are in contact with the log, the movement being transmitted from a motor 31 (Figure 2) by means of a chain drive 32, a shaft 33 mounted in the frame 9, toothed wheels 34 secured to said shaft, toothed wheels 35 and toothed wheels 36 secured to the rolls 29, 30. The rolls 29, 30 are each mounted on its shaft 37, carried by a bracket 38, which is secured to the frame 9. Furthermore, there are two supporting rolls 39, 40, each mounted on its shaft 41 and bracket 42. Of course, said rolls 39 and 40, too, may be driven. For pressing the log against the rolls 29, 30, 39 and 40 there are provided two rolls 44 mounted on arms 43. The arms 43 are mounted on pivots 45, secured to brackets 46 on the frame 9, and are provided with pins 47 by means of which they are actuated by a piston 48, which is movable within a cylinder 49 and which in its turn is attached to the bracket 46 by means of pins 50 and brackets 51. By means of oil or air as a pressure medium in the cylinder 49 each roll 44 under a suitable pressure is pressed against logs of various diameters and is also lifted by means of this hydraulic device when logs are to be exchanged. Although the rolls 44 are not shown to be driven, means for driving the same may easily be provided. All rolls are arranged obliquely at a suitable angle for the purpose of obtaining the desired helical rotation of the log.

The machine is preferably fed with new logs from the side. The barking of the log in the machine having been finished the rolls 44 are moved upwards, in which case the chains 2 will press the log to the left out of the machine. An unbarked log, previously moved into position beside the machine, is then moved to the right, into the machine, and the rolls 44 move down again to contact the log, by which the log will be pressed against the rolls 29, 39 and/or 30, 40. It may be advantageous for the log to come into contact with the chains for a time sufficient to permit them to cut through the bark before the log comes into contact with the rolls 29, 30, 39 and 40. The mechanical means for feeding the machine with logs may be manually controlled but it is also very easy to carry out the operations in question automatically.

The devices for feeding the machine with logs may be embodied in many different ways. As regards the machine itself it is not necessary to provide chains along the whole length of the machine in contact with the log. Furthermore, the logs may be introduced into the machine at the end of the same and discharged at the opposite end.

One embodiment of the invention having now been described in detail others, shown by figures, will be described more cursorily.

Particularly at high frequencies it may be suitable to provide the chain with driving means at both ends. For such an embodiment Figure 3 illustrates the driving mechanism for chain and log, said mechanism being intended to be mounted on a frame similar to that shown in Figure 1. One or more chains may also be arranged in a manner corresponding to that shown in Figure 2. In Figure 3 the rolls 55, 56 and 57 are arranged in such a manner that the log 58 is rotated helically at a large pitch but of course they may also be provided in a manner shown in Figures 1 and 2. By arranging the chains obliquely in a suitable manner in relation to the direction of rotation of the log the chains will be twisted onto the log during the feeding thereof through the machine. At both ends the chain 59 is secured to pivotable arms 60, 61, for example, by means of axial ball bearings 62, 63, and a helical spring 64 is provided between the axial bearing 63 and the pivotable arm 61, said spring 64 being intended to compensate different distances between the pivotable arms along the chain, caused by unevennesses of the log and by the arms not swinging absolutely in time in different positions of an arm 65. The arm 60 is mounted on a pin 66, rigid with the frame. The pivotable arms 61 is mounted on a pin 67, which is carried by the previously mentioned arm 65, which in turn is supported by a pin 68—rigid with the frame—and is actuated by the counterweights 69 carried on spindle 70. The motion of the chain is obtained from eccentrically placed pins 72, 73 of the discs 71 and is transmitted to the pivotable arms 60 and 61 by means of rods 74 and 75 respectively. The discs 71 are mounted on a common shaft, which is rotated by means of a cone belt disc 76, provided between the discs 71, said disc 76 being in turn driven by a disc 77 on a transmission shaft 78 extending along the machine.

Figure 4 illustrates an embodiment, in which the means carrying a chain 79, for example, a yoke member 80, are adapted to turn on a pivot 81. A log 82 is fed in a direction towards or away from the plane of the paper. The motion of the chain 79 required for the barking is obtained in the following manner: A crank 83 at the center of motion of the yoke is rotated on a pivot 84 and imparts to a wire 85 or the like a motion in one direction and a spring in a sleeve 86 imparts a corresponding motion in the other direction. The chain 79 is secured to the wire 85, for example, at the middle thereof, whereas the ends of the chain are secured to tilting arms 87 mounted on the yoke 80. Under the influence of springs 88 the arms 87 keep the chain tightened around the log during the barking operation. When the log has left the yoke, those ends of the arms 87, next to the log, and the chain 79 move to the positions indicated in dashed lines in the figure. When a new log is to be introduced, the yoke is moved about pivot 81 until it is far enough from the center of the log to permit the introduction of a new log. After that the yoke is moved towards the center of the log, and the barking begins again. In this embodiment the arms 87 may be replaced by return rollers 159 (Fig. 16), which are mounted on the yoke 80 and over which the chain 79 is adapted to run. In such a case it is preferred to secure the ends of the chain directly to the springs 88.

Figure 5:
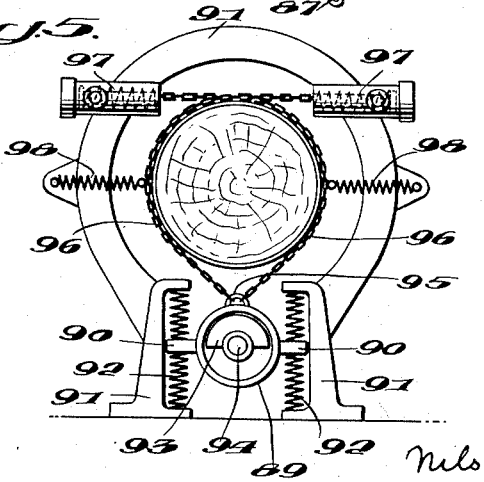

The motion required for the barking may also be obtained from a vibrator, as shown in Figure 5. The vibrator comprises a casing 89, shaped with lugs 90 and fastened between springs 92 provided in a frame 91, the tension of the springs 92 preferably being adjustable by any conventional means. The unbalanced member 93 and a shaft 94, impart to the casing of the vibrator a rocking or vibratory motion. By designing the springs 92 in a suitable may the system may be caused to swing in resonance, long strokes being obtained with a small driving force. Resonance swinging effect may be obtained also in the previously described embodiments by suitable use of springs for the actuation of the chain. In a loop 95 of the vibrator casing 89, one end of each of two chains 96 is secured. They encircle the log by an angle not quite amounting to 180° and are held under tension by springs in spring sleeves 97 mounted on the frame 91. The provision of the springs 98, secured to the chains, makes it possible also to provide an opening for the log only by moving the chains away from the log outwards, when seen in the plane of the paper. If desired, wires or similar members may be provided instead of chains.

Figures 6 and 7 show an embodiment, in which the total encircling angle of the chains, when added together, has been chosen to be about 360°. There are four chains 99 together encircling the whole circumference of the log. Each chain, in the manner already described, receives its motion from cranks 100, mounted on a frame, not shown, and from the springs in sleeves 101, jointed to an annulus 102, adapted to run in the journal 103 rigid with the frame. When a new log is to be introduced the annulus 102 is moved in the direction of the arrow B. The log having been introduced, the annulus 102 is returned to the position shown. If an increased encircling of the log or an increased spring tension are desired, for example, if the log should prove difficult to bark, the annulus 102 is moved further in the direction of the arrow C. In the same way the spring pressure may be reduced, if the chains tend to cut down into the wood or if the log should prove easy to bark.

In order to make it possible also to bark uneven logs and logs with twigs it is proposed to secure the chain in such a manner that it is able to turn around its own longitudinal axis, this being exemplified in Figures 8, 9 and 10. A chain 104 encircles a log 105 and, at its two ends, is secured to pins 106, 107. By means of a crank 108 and a spring 109, reciprocating motion is obtained in the manner previously described. On the crank 108 there is mounted a sleeve 110 and on the latter the bearing box 111 is bolted by means of screws 112 (Figure 9). The pressure existing in the longitudinal direction of the chain is received by an axial ball bearing 113, mounted between the flange of the pin 106 and the box 111, thus enabling the chain to turn around its own longitudinal axis. At its other end the chain is arranged in the same manner. At that end an axial roller bearing 114 is mounted between the flange of the pin 107 and a washer 115 resting against the spring 109. To guarantee the rolling of the chain the latter may be driven around its longitudinal axis, as shown in Figure 10. The driving moment is transmitted from a transmission shaft or motor shaft 116 through a sprocket wheel 117 and a chain 118 to a sprocket wheel 119, which in turn rotates a spring 120, a washer 121 and thus the barking chain 104. In addition to the fact that in this embodiment a smooth run of the chain is obtained, by the chain rolling over twigs and the like, the chain more easily will move on to the ends of the log both in the driven and in the non-driven embodiment of the chain.

In order to be able to easily introduce non-rotating logs into a machine, chains 122, in Figures 11 and 12, have been arranged in the form of a cone between two rings 123 and 124 connected with each other by means of stays 125 and provided with sleeves 126, sliding on a shaft 128 secured in frames 127. Preferably there is mounted one shaft 128 on each side of the log. A reciprocating motion is obtained from crank arms 129 and is transmitted to the ring 123 by means of connecting rods 130. The crank arms 129 are driven, for example, by cone belt drives 154. On the ring 124, springs housed in sleeves 131 are provided in the usual manner, one sleeve for each chain. On the shafts 128 there are provided helical springs 155 for receiving the acceleration force et cetera.

Figures 13 and 14 show an embodiment, in which a chain is moved at an angle to its own longitudinal direction. The chain 132 is kept tightened around the log by means of springs 133. The motion is transmitted from a crank arm 134, through a connecting rod 135, a yoke member 136 and buffer bars 137 to the chain 132. The yoke 136 is journaled in bearings 138 by pins 139.

In Fig. 15, as stated above, the ends of the chain 144 are secured through the springs 145 to the ends of the U-shaped arm 156 which is pivoted at 157 and is reciprocated about this point by the arm 146 and link 147 connected to the crank 158.

With barking machines in accordance with the present invention a great number of advantages are obtained. Due to the fact that the machine need be dimensioned only with respect to the stresses, which one or, in any case, a few logs may exert, the construction of the machine will be light and slender, which makes it possible to effect barking at places where previously barking had to be done by hand. The losses of wood are none, the barking member moving above the wood all the time, and the power consumption is very low. The contact pressure of the barking member against the log may, by means of a lever or the like, be adjusted in a simple way while the barking is going on and in such a case it is of advantage to have a clear view of the log. Likewise, a log may be kept in the machine for more rotations than is normally required, by which also the most difficultly barked logs will become clean. Machines according to the invention may be built in very different embodiments to meet the special requirements existing at different places. The capacity may be chosen within wide limits and with it also the size of the machine from large, stationary plants to portable barking machines in the woods. Furthermore, the machine may be easily made fully automatic so that one man may operate several machines at the same time.

Having now described my invention, what I claim as new and desire to secure by Letters Patent is:

1. A machine adapted for removing bark from logs, comprising at least one elongated flexible member adapted for barking, an element resiliently supporting at least one end of said barking member, means for bringing a log member and said barking member into frictional engagement with each other, means for maintaining and releasing such frictional engagement, means for causing translatory movement of at least one of the frictionally engaged members relatively to the other and means for causing reciprocating movement of at least one of the frictionally engaged members relatively to the other.

2. A machine as claimed in claim 1, in which the barking member extends in a plane oblique to the longitudinal axis of the log.

3. A machine as claimed in claim 1, in which the barking member extends in a plane perpendicular to the longitudinal axis of the log.

4. A machine as claimed in claim 1, in which the means for causing reciprocating motion are attached to only one end of the barking member.

5. A machine as claimed in claim 1, in which the means for causing reciprocating motion are attached to both ends of the barking member.

6. A machine as claimed in claim 1, in which the barking member supporting elements include means which mount the barking member for rotation around its longitudinal axis.

7. A machine as claimed in claim 1, in which means are provided for rotating the barking member around its longitudinal axis.

8. A machine as claimed in claim 1, in which the ends of the barking member are secured to rigid elements, which are resiliently connected with each other.

9. A machine as claimed in claim 1, in which the ends of the barking member are resiliently secured to elements, which are rigidly connected with each other.

10. A machine as claimed in claim 1 in which said means causing reciprocating motion is connected to one end of the flexible member, and another end of said flexible member is attached to said resiliently-supporting element.

11. A machine as claimed in claim 1 in which said means causing reciprocating motion is connected to one end of the flexible member, the other end of the flexible member being attached to said resiliently-supporting element and vibrating at the same rate as the reciprocating movement of said member, and said resiliently-supporting element being supported in turn by means which maintain a substantially constant tension thereon.

NILS GUSTAV LEFFLER.

REFERENCES CITED

The following references are of record in the file of this patent:

UNITED STATES PATENTS

| Number | Name | Date |
| --- | --- | --- |
| 300,996 | Merziger | June 24, 1884 |
| 516,091 | Hargrave | Mar. 6, 1894 |
| 540,980 | Hargrave | June 11, 1895 |
| 664,535 | Dickinson | Dec. 25, 1900 |
| 892,176 | Moravec | June 30, 1908 |
| 1,017,655 | Drake | Feb. 20, 1912 |
| 1,263,836 | Ball | Apr. 23, 1918 |
| 1,539,603 | Saprones | May 26, 1925 |
| 1,898,964 | Jinnett | Feb. 21, 1933 |
| 1,899,379 | Adams | Feb. 28, 1933 |
| 1,937,073 | Stove | Nov. 28, 1933 |
| 2,025,337 | Camden | Dec. 24, 1935 |
| 2,390,459 | Power | Dec. 4, 1945 |

FOREIGN PATENTS

| Number | Country | Date |
| --- | --- | --- |
| 69,348 | Sweden | Sept. 22, 1928 |